United States Patent
Ananth et al.

(10) Patent No.: US 11,337,080 B1
(45) Date of Patent: May 17, 2022

(54) HIGH ALTITUDE PLATFORM BEAM ARRANGEMENT

(71) Applicant: SoftBank Corp., Tokyo (JP)

(72) Inventors: Sharath Ananth, Cupertino, CA (US); Mitchell Trott, San Mateo, CA (US); Paul Heninwolf, San Carlos, CA (US)

(73) Assignee: SoftBank Corp., Tokyo (JP)

(*) Notice: Subject to any disclaimer, the term of this patent is extended or adjusted under 35 U.S.C. 154(b) by 755 days.

(21) Appl. No.: 16/221,920

(22) Filed: Dec. 17, 2018

(51) Int. Cl.
| H04W 16/28 | (2009.01) |
| H04B 7/06 | (2006.01) |
| H04B 7/0408 | (2017.01) |
| H04W 36/30 | (2009.01) |
| H04W 72/04 | (2009.01) |

(52) U.S. Cl.
CPC .......... *H04W 16/28* (2013.01); *H04B 7/0408* (2013.01); *H04B 7/0617* (2013.01); *H04B 7/0695* (2013.01); *H04W 36/30* (2013.01); *H04W 72/046* (2013.01)

(58) Field of Classification Search
CPC ... H04W 16/28; H04W 36/30; H04W 72/046; H04B 7/0408; H04B 7/0617; H04B 7/0695
See application file for complete search history.

(56) References Cited

U.S. PATENT DOCUMENTS

| 9,614,608 | B2 | 4/2017 | Jalali et al. |
| 9,853,713 | B2 | 12/2017 | Jalali |
| 2003/0095065 | A1* | 5/2003 | Ericson .................. H04W 16/28 342/354 |
| 2014/0045420 | A1* | 2/2014 | Tong .................. H04B 7/18506 455/12.1 |
| 2018/0042000 | A1* | 2/2018 | Zhang ..................... H04B 7/088 |
| 2018/0054251 | A1 | 2/2018 | Alex |
| 2018/0166779 | A1 | 6/2018 | Feria et al. |

(Continued)

FOREIGN PATENT DOCUMENTS

WO      2018217814 A1      11/2018

OTHER PUBLICATIONS

3GPP; TSG RAN; Solutions for NR to support non-terrestrial networks (NTN) (Release 16), 3GPP TR 38.821 V0.3.0, Dec. 1, 2018, pp. 1-36, sections 8.3-8.3.1.

(Continued)

*Primary Examiner* — Janice N Tieu
(74) *Attorney, Agent, or Firm* — Botos Churchill IP Law

(57) ABSTRACT

The disclosure provides for a communication system. The communication system includes a station moving relative to a geographic area, a plurality of antennas, and one or more processors configured to control the plurality of antennas. For instance, the one or more processors may be configured to control a first antenna of the plurality of antennas to output a primary beam to cover the geographic area, wherein the primary beam is associated with a primary cell having a first center frequency, and to control a second set of antennas of the plurality of antennas to output a plurality of secondary beams to cover a plurality of locations within the geographic area, wherein the plurality of secondary beams each has a beam angle smaller than the primary beam, and wherein the plurality of secondary beams are all associated with a secondary cell having a second center frequency.

20 Claims, 6 Drawing Sheets

(56) References Cited

U.S. PATENT DOCUMENTS

2018/0176801 A1     6/2018  Rune
2019/0335491 A1*   10/2019  Venugopal ............ H04L 5/0044
2020/0077138 A1*    3/2020  Sawyer ................ G06F 3/1446

OTHER PUBLICATIONS

International Search Report an Written Opinion for Application No. PCT/US2019/065451 dated Apr. 7, 2020.

ZTE Corporation et al., Challenge on the paging performance in NTN,R2-1816717, 3GPP TSG-RAN WG2 Meeting#104, Nov. 1, 2018, pp. 1-7, section 3, Spokane, USA.

ZTE Corporation et al., Consideration on the cell definition and NTN mobility, R2-1817062, 3GPP TSG-RAN WG2 Meeting#104, Nov. 2, 2018, pp. 1-13, sections 2.1-2.2.1, Spokane, USA.

* cited by examiner

HIGH ALTITUDE PLATFORM BEAM ARRANGEMENT

BACKGROUND

A High Altitude Platform (HAP) may be a base station for a communication network. For example, an HAP station may be an LTE base station that provide telecommunication service to user devices on the ground. An HAP station may be configured to perform "station keeping" by moving in a circuit above the ground while outputting beams of electromagnetic signals forming a beam pattern on the ground. Client devices and/or other stations on the ground may communicate with the HAP station through the beams. As the HAP station moves, the motion may cause the beams to also move, for instance rotate, which in turn can affect signal quality of the beams.

BRIEF SUMMARY

Aspects of the disclosure provides for a communication system comprising a station moving relative to a geographic area; a plurality of antennas; and one or more processors configured to control a first antenna of the plurality of antennas to output a primary beam to cover the geographic area, wherein the primary beam is associated with a primary cell having a first center frequency; and control a second set of antennas of the plurality of antennas to output a plurality of secondary beams to cover a plurality of locations within the geographic area, wherein the plurality of secondary beams each has a beam angle smaller than the primary beam, and the plurality of secondary beams are all associated with a secondary cell having a second center frequency.

The one or more processors may be further configured to control the first antenna to establish using the primary beam a first communication link between the client device and the primary cell such that the client device is in a radio resource control (RRC)-idle state on the primary cell.

The one or more processors may be further configured to determine that the client device transitions from the RRC-idle state to an RRC-connected state on the primary cell; determine that the client device is at a location covered by a first secondary beam outputted by a given one of the second set of antennas; control the given one of the second set of antennas to establish, using the first secondary beam, a second communication link between the client device and the secondary cell; and instruct the client device to bond the primary cell and the secondary cell using carrier aggregation. The one or more processors may be further configured to control the plurality of antennas to simultaneously maintain both the first communication link and the second communication link with the client device.

The one or more processors may be further configured to receive, from the client device, a signal quality of the second communication link measured by the client device; determine that the signal quality of the second communication link is below a predetermined threshold; determine that the client device is covered by a second secondary beam of the plurality of secondary beams outputted by a second given one of the second set of antennas; control the second given one of the second set of antennas to re-establish, using the second secondary beam, the second communication link with the client device.

The one or more processors may be further configured to control the second set of antennas so that interference caused by an overlap between the plurality of secondary beams is within a predetermined threshold.

The primary beam may be configured to have a first PCI associated with the primary cell, and the plurality of secondary beams are each configured to have a second PCI associated with the second cell. The first center frequency of the primary cell may be lower than the second center frequency of the secondary cell.

The plurality of secondary beams may move along with the station such that a coverage area of each of the plurality of secondary beams changes as the station moves.

The one or more processors may be further configured to control data traffic at the station such that a first fraction of data is transmitted using the primary beam, and a second fraction of data is transmitted using the plurality of secondary beams, wherein the first fraction is smaller than the second fraction. The one or more processors may be configured to control data traffic at the station such that a first set of predetermined types of data is transmitted using the primary beam, and a second set of predetermined types of data is transmitted using the plurality of secondary beams. The first set of predetermined types of data may include voice call data.

The one or more processors may be further configured to allocate a first bandwidth to the primary beam; allocate a second bandwidth to the plurality of secondary beams, wherein the second bandwidth is larger than the first bandwidth.

The one or more processors may be further configured to control the second set of antennas so that the plurality of secondary beams have one or more overlapping regions; control the second set of antennas so that data is not transmitted in the overlapping regions.

The one or more processors may be further configured to determine that a plurality of client devices in the geographic area are located in areas covered by a set of different secondary beams of the plurality of secondary beams; schedule simultaneous data transmission to the plurality of client devices using the set of different secondary beams; control the second set of antennas to simultaneously transmit data to the plurality of client devices based on the schedule.

The one or more processors may be further configured to determine that, due to movements, the plurality of client devices are covered by a new set of different secondary beams of the plurality of secondary beams; control the second set of antennas to simultaneously transmit data to the plurality of client devices using the new set of different secondary beams.

The one or more processors may be further configured to determine that a plurality of client devices in the geographic area are located in areas covered by a given one of the plurality of secondary beams outputted by a given one of the second set of antennas; control the given one of the second set of antennas so that data is transmitted to the plurality of client devices sequentially in a cycle.

The one or more processors may be further configured to determine that the client device initiates a random access procedure for transitioning from the RRC-idle state to an RRC-connected state; determine that the client device is at a location covered by a first secondary beam outputted by a given one of the second set of antennas; control the given one of the second set of antennas to establish, using the first secondary beam, a second communication link between the client device and the secondary cell; instruct the client device to enter the RRC-connected state on the secondary cell.

The one or more processors may be further configured to receive, from the client device, a signal quality of the second communication link measured by the client device; determine that the signal quality of the second communication link is below a predetermined threshold; instruct the client device to initiate a handover to the primary cell.

The communication system may further comprise a tracking system for tracking locations of client devices.

DETAILED DESCRIPTION

Overview

Figure 1:
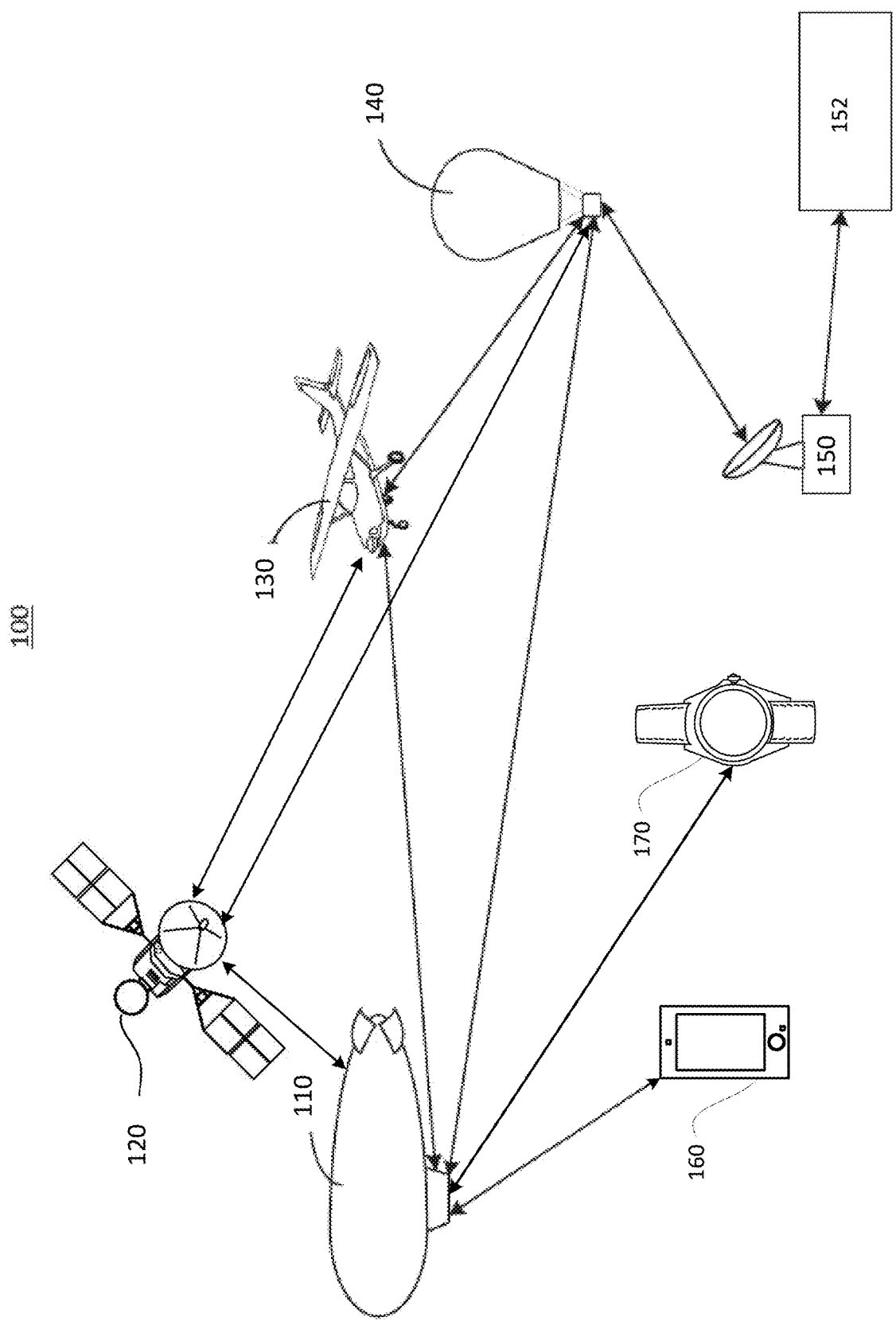
FIG. 1 is a pictorial diagram of an example communication network 100 in accordance with aspects of the disclosure.

The technology relates to a mobile platform station. Mobile platform stations such as a High Altitude Platform (HAP) station may be in motion relative to a geographic area while outputting beams of electromagnetic signals for communication with client devices on the ground. However, a beam outputted by the mobile station may move with the station, which may cause changes in signal quality of a communication link established in the beam with a client device on the ground.

When signal quality deteriorates, reselection and/or handover may occur. In LTE communication, reselection occurs in the radio resource control (RRC)-idle state. For instance, while a client device is "camped" on a cell (or channel or carrier) awaiting incoming and/or outgoing data (RRC-idle), the client device may monitor signals from neighboring cells. If a neighboring cell meets certain reselection criteria, the client device may reselect that neighboring cell to camp on. However, reselection of a previously undetected cell may be slow, for example such as taking 30 seconds or more in the situation where the client device has to scan multiple frequencies and Radio Access Technologies (RATs) before reselecting. Handover may occur in the RRC-connected state. For instance, while a client device is transmitting data to or receiving data from the station (RRC-connected) through an uplink or downlink of a cell, the uplink or downlink may deteriorate to a certain extent such that the client device may initiate a handover procedure to transfer its connection to a different cell with a better signal quality. However, the uplink or downlink may be so deteriorated such that the client device cannot initiate handover, and the client device may declare a radio link failure (RLF).

Frequent reselections and handovers may have negative consequences to both client devices and the communication system. For example, frequent reselections and handovers may cause connection outages for a client device, degrade user data connection for the client device, and even degrade battery life of the client device. For another example, frequent reselections and handovers may degrade throughput of the communication system overall. To resolve these issues, a communication system may be configured to output a beam arrangement that reduces or even eliminates the need for reselections and/or handovers.

In this regard, the communication system may include a station moving relative to a geographic area, a plurality of antennas located on the station, and one or more processors of the station configured to control the plurality of antennas. For instance, the processors of the station may control a first antenna of the plurality of antennas to output a primary beam to cover the geographic area, wherein the primary beam is associated with a primary cell (or channel or carrier) of the station having a first center frequency. The processors of the station may further control a second set of antennas of the plurality of antennas to output a plurality of secondary beams to cover a plurality of locations within the geographic area. The plurality of secondary beams each has a beam angle smaller than the primary beam, and wherein the plurality of secondary beams are all associated with a secondary cell (or channel or carrier) having a second center frequency. In addition, since all of the plurality of secondary beams are associated with the same secondary cell, all of the plurality of secondary beams may have the same physical cell identification ("PCI").

For instance, the processors of the station may determine that a client device is located in the geographic area, and control the first antenna to establish using the primary beam a first communication link between the client device and the primary cell so that the client device is on the primary cell in an RRC-idle state. In this RRC-idle state, because signal quality of the wide primary beam remains stable despite movement of the station, the need for reselection may be reduced or even eliminated.

When downlink data arrives at the station for the client device, or when the client device has uplink data to send to the station, the client device may enter an RRC-connected state. In order to do so, while in the RRC-idle state, the client device may measure signal qualities of multiple cells (or carriers or channels) in its vicinity, and report the measured signal qualities to the station. If the client device has carrier aggregation capabilities, the client device may transition into the RRC-connected state on the primary cell through the primary beam, the processors of the station may instruct the client device to also connect to the secondary cell using carrier aggregation. For example, the processors of the station may control a given one of the second set of antennas to establish a second communication link between the client device and the secondary cell through a first secondary beam of the plurality of the secondary beams.

If the client device does not have carrier aggregation capabilities, the client device may send a Random-Access Channel (RACH), and the processors of the station may instruct the client device to transition into the RRC-connected state on the secondary cell. For example, the processors of the station may control a given one of the second set of antennas to establish a second communication link between the client device and the secondary cell through a first secondary beam of the plurality of the secondary beams. Since the client device does not have carrier aggregation capabilities, the first communication link may be destroyed.

The processors of the station may continue to monitor the location of the client device and receive measured signal quality of the second communication link from the client device. If the processors of the station determine that the signal quality of the second communication link is below a predetermined threshold, the processors of the station may also determine whether the client device is covered by a second secondary beam of the plurality of secondary beams outputted by a second given one of the second set of antennas. If so, the processors of the station may control the second given one of the second set of antennas to re-establish, using the second secondary beam, the second communication link with the client device. Since all of the plurality of secondary beams are associated with the same secondary cell and have the same PCI, the client device need not initiate a handover between different cells.

Where carrier aggregation capabilities are available on a client device, the beam arrangement may further reduce the need for handovers and reselection. For instance, the processors may be configured to simultaneously maintain both the first communication link and the second communication link with the client device using carrier aggregation. While signal quality of the wide primary beam remains stable despite movement of the station, signal quality of the secondary beams may vary. However, the client device is typically configured to use only the signal quality of the primary cell or carrier to decide when to initiate handover; thus the signal quality of the secondary cell or carrier can fluctuate without the client device initiating handover or triggering reselection.

Where carrier aggregation capabilities are not available on a client device, the beam arrangement may reduce the impact of handovers and reselection. For instance, when the second communication link has deteriorated, the client device may initiate handover to the primary beam. Since signal quality of the wide primary beam remains stable despite movement of the station, the client device will not declare an RLF during the handover.

The processors of the station may additionally be configured to increase efficiency of the communication system using the beam arrangement. For instance, the processors of the station may be configured to control data traffic to the primary beam and the plurality of secondary beams. For example, the primary beam, being wider, has a lower power gain than each of the plurality of secondary beams. As such, the processors of the station may be configured to direct a large fraction of data to transmit through the plurality of secondary beams, and a small fraction of data to transmit through the primary beam. As such, this may ensure that the bulk of data transmission is power efficient. Further, greater bandwidths may be allocated to the plurality of secondary beams than the primary beam to handle the greater fraction of data transmitted through the plurality of secondary beams.

Additionally, since lower frequencies have better propagation properties but are more expensive to purchase than higher frequencies, the first center frequency for the primary cell may be selected to be lower than the second frequency for the secondary cell. This way, wide consistent coverage may be ensured by the lower frequency primary beam with better propagation properties, while data capacity (or throughput) may be ensured at a lower cost by the higher frequency plurality of secondary beams.

For still another instance, the processors of the station may be configured to schedule data transmission to and from a plurality of client devices located in the geographic area using the plurality of secondary beams. In this regard, the processors of the station may schedule simultaneous data transmission to a plurality of client devices located in areas covered by different secondary beams of the plurality of secondary beams. Further, as the station moves, the processors of the station may track the location of the client device and the locations of the plurality of secondary beams, and schedule data transmission using the plurality of secondary beams based on these tracked locations.

The features described herein may provide more consistent coverage to client devices in a geographic area. The beam arrangement as described allows client devices to be transferred from one beam to another beam of a mobile station seamlessly, without the client device having to initiate handover procedures. By using a wide primary beam with better propagation qualities for a primary cell or carrier, the beam arrangement as described reduces or eliminates the need for reselection and/or handover within the geographic area covered by the wide primary beam. By using a plurality of narrower secondary beams for a secondary cell or carrier, the beam arrangement allows data to be transmitted to a client device through the plurality of secondary beams seamlessly without a handover. The plurality of narrower secondary beams also increase data capacity of the communication system by allowing simultaneous data transmissions to client devices located in areas covered by different secondary beams. Further, by selecting different frequencies for the first and secondary cells, data capacity or throughput of the communication system may be provided at a lower cost. In addition, by dividing data traffic and bandwidths between the primary beam and the plurality of secondary beams, the communication system may be more efficient.

Example Systems

FIG. 1 shows an example communication network 100. One or more nodes of the network may be high-altitude platform (HAP) stations such as, for example, balloons, blimps, airplanes, unmanned aerial vehicles (UAVs), satellites, or any other form of high altitude platform. For example, stations 110, 120, 130, and 140 may be HAP stations, and station 150 may be a ground station. HAP stations may include blimps, such as HAP station 110, satellites, such as HAP station 120, airplanes, such as HAP station 130, and balloons, such as HAP station 140. HAP stations may be configured to move in airspace above the ground. For instance, HAP station 110 may be configured to move in a circuit. For example, HAP station 110 may be configured to move in a circuit that has a circular pattern, where each circuit takes a few minutes to complete. The one or more ground stations such as ground station 150 may be associated with one or more datacenters such as data center 152.

Each station of communication network 100 may include one or more terminals that allow the station to send and receive electromagnetic signals. For instance, each of the HAP stations 110, 120, 130, and 140 may be configured for LTE communication with one or more other HAP stations, e.g., a horizontal or peer to peer link, or with links between a HAP station and a ground station, i.e., a vertical link. Arrows shown between a pair of stations represent possible communication links between the pair of stations.

Communication network 100 may serve as an access network for client devices such as cellular phones, laptop computers, desktop computers, wearable devices, or tablet computers. For example as shown, client device 160 and client device 170 are shown forming communication links (indicated by arrows) with HAP station 110. For instance, client devices 160 and 170 may be configured for LTE communication with HAP station 110 through communication links. For example, client devices 160 may receive data transmitted from HAP station 110 through a downlink, and may send data to HAP station 110 through an uplink.

The communication network 100 as shown in FIG. 1 is illustrative only, and in some implementations the communication network 100 may include additional or different stations. For example, in some implementations, the communication network 100 may include additional HAP stations. The communication network 100 also may be connected to a larger network, such as the Internet, and may be configured to provide a client device with access to resources stored on or provided through the larger computer network.

Figure 2:
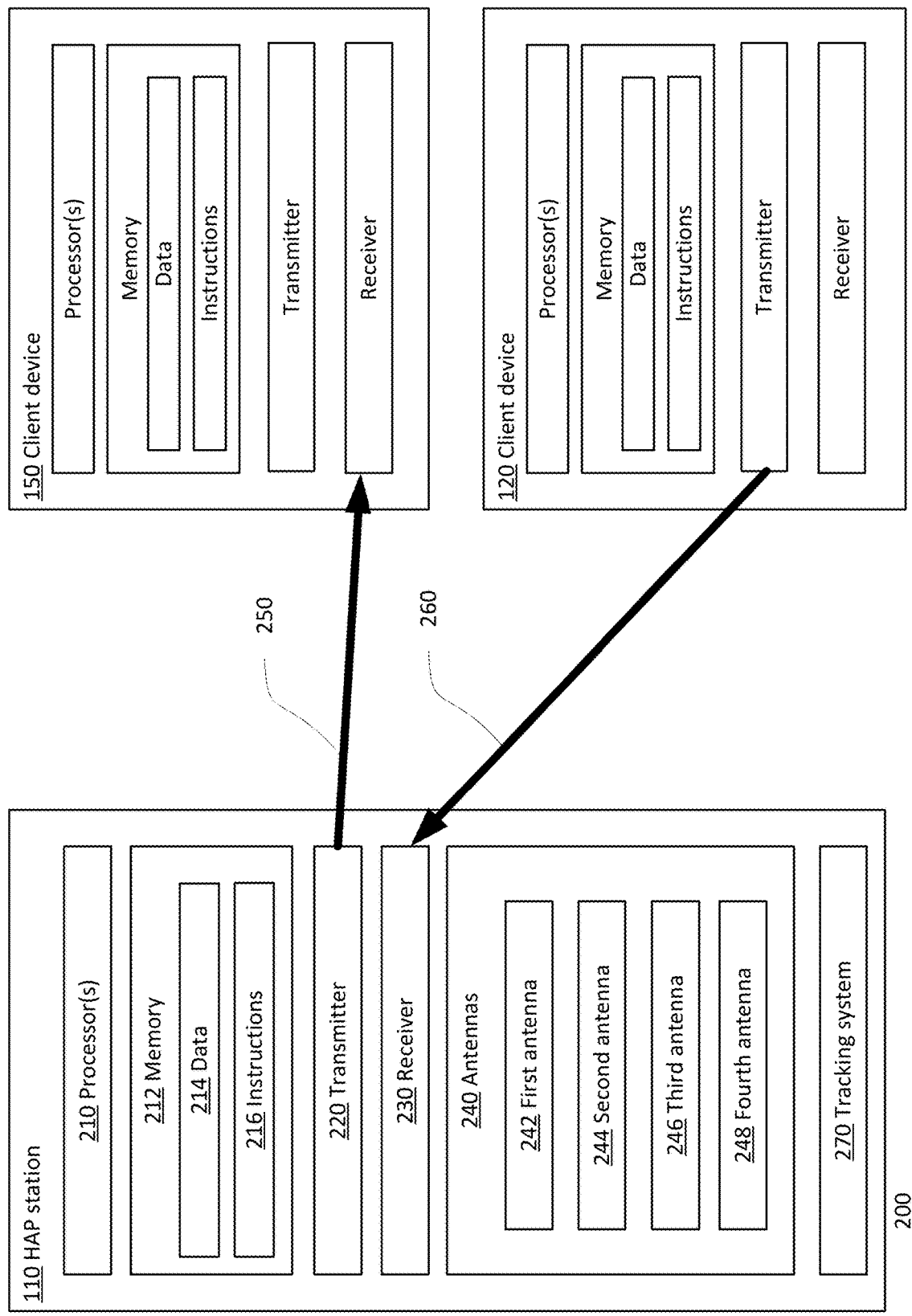
FIG. 2 is a functional diagram of a portion 200 of the communication network 100 shown in FIG. 1 in accordance with aspects of the disclosure.

Referring to FIG. 2, which shows a portion 200 of the networks 100 of FIG. 1, a station in the network may be configured to communicate with client devices. Only one station is depicted for simplicity and ease of understanding. As shown, HAP station 110 may include one or more processors 210, a memory 212, one or more transmitters 220, one or more receivers 230, a plurality of antennas 240, and a tracking system 270. Although the following description relates to the features of HAP station 110, it will be appreciated that each of the HAP stations 120-140 of the communication network 100 may have the same or similar configurations of features.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214 and instructions 216 that may be executed by the one or more processors 210. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

Data 214 may be retrieved, stored or modified by the one or more processors 210 in accordance with the instructions 216. For instance, although the system and method is not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

Instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more processors 210 in communication with the one or more transmitters 220 and the one or more receivers 230. The one or more transmitters 220 and receivers 230 may be part of a transceiver arrangement in the HAP station 110. The one or more processors 210 may therefore be configured to transmit, via the one or more transmitters 220, data in a communication signal, and also may be configured to receive, via the one or more receivers 230, data in a communication signal. The received communication signal may be processed by the one or more processors 210 to extract the data.

The one or more transmitters 220 may be configured to output a plurality of beams that allow HAP station 110 to locate and send communication signals to other stations and client devices. The communication signal may be a signal configured to travel through free space, such as, for example, a radio-frequency signal or optical signal. In some cases, the one or more transmitters 220 may include multiple transmitters, each configured to transmit one beam of the plurality of beams. Alternatively, the one or more transmitters 220 may be one transmitter configured to output the plurality of beams.

Each of the plurality of beams reaches the ground to cover an area on the ground. For example, one of the plurality of beams may cover a large area, such as an area having a 20 km radius or more or less, another of the plurality of beams may cover a small area, such as an area having a 5 km radius or more or less. In this regard, processors 210 may be configured to control the one or more transmitters 220 to control the beam angle for each of the plurality of beams. For instance, the greater the beam angle of a beam, the greater the coverage area by the beam on the ground.

The one or more transmitters 220 and one or more receivers 230 of the HAP station 110 may be configured to establish communication links with client devices through the plurality of beams. For instance, client device 160 may be within an area on the ground covered by at least one of the plurality of beams of HAP station 110, client device 160 may establish a line-of-sight link with the HAP station 110 or otherwise align with the HAP station 110. As a result, a communication link that allows for the transmission of communication signals from the HAP station 110 to the client device 160 may be established, which is shown as downlink 250. Similarly, a communication link that allows for the transmission of communication signals from the client device 170 to the HAP station 110 may be established, which is shown as uplink 260. Downlink 250 and uplink 260 in this example may be LTE links. Alternatively, communication links between HAP station 110 and client devices may be optical communication links or another type of communication link capable of travelling through free space.

In order to output the plurality of beams, the HAP station 110 further includes a plurality of antennas 240, which may be controlled by the processors 210. For example as shown, the plurality of antennas 240 may include a first antenna 242, a second antenna 244, a third antenna 246, and a fourth antenna 248. Each of the plurality of antennas may be configured to send electromagnetic signals forming the plurality of beams. The plurality of antennas 240 may be configured to send electromagnetic signals in the same or different frequency ranges. For example, the first antenna 242 may be configured to output a beam in a first LTE frequency range, while each of the second, third, and fourth antennas 244, 246, and 248 may each be configured to output a beam in a second LTE frequency range. The plurality of antennas 240 may further include receive antennas for receiving electromagnetic signals from client devices located in areas covered by the plurality of beams. In some instances, more than one receive antennas may be configured to receive signals from client devices located in one area covered by a given beam.

Each of the plurality of antennas 240 may be in a fixed position with respect to one another as well as a steering mechanism. For example, the steering mechanism may be a gimbal configured to move each of the plurality of antennas 240 with respect to the HAP station 110. As other examples, the steering mechanism may be an electrical mechanism that steers beams by changing the amplitude and/or phase of the beams, such as digital beamforming, analog beamforming, etc. The steering mechanism may be configured to steer the one or more transmitters 220, receivers 230, and/or the plurality of antennas 240 in at least two degrees of freedom, such as, for example, yaw and pitch. Using the steering mechanism, each of the plurality of antennas 240 may be pointed in a given direction, or a pointing direction, to send or receive an electromagnetic signal to or from the given direction. For example, the first antenna 242 of the HAP station 110 may be pointed to the ground in a first pointing direction, the second antenna 244 of the HAP station 110 may be pointed to the ground in a second pointing direction, the third antenna 246 of the HAP station 110 may be pointed to the ground in a third pointing direction, and the fourth antenna 248 of the HAP station 110 may be pointed to the ground in a fourth pointing direction. As such, the first antenna 242, the second antenna 244, the third antenna 246, and fourth antenna 248 may be able to establish communication links with client devices at different locations on the ground.

The one or more processors 210 of HAP station 110 may be configured to change the pointing directions of the plurality of antennas 240, for example by controlling the steering mechanism. For instance, the one or more processors 210 may control the first antenna 242 of the plurality of antennas 240 to change from the first pointing direction to the second pointing direction. A pointing direction of a given antenna of the plurality of antennas 240 may also be changed based on relative movements of one or more client devices such as client devices 160 and 170, or relative movements of other stations such as stations 120-150, in order to maintain a communication link.

The adjustments to the pointing directions of the plurality of antennas 240 may be made to acquire a communication link, such as downlink 250 and uplink 260, between the HAP station 110 and the client devices 160 and 170, respectively. To perform a search for a communication link, the one or more processors 210 may be configured to use the steering mechanism to point the one or more transmitters 220 and/or receivers 230 in a series of varying directions until a communication link is acquired. In addition, the adjustments may optimize transmission of communication signals from the transmitters 220 and/or reception of communication signals at the receivers 230.

In addition, the one or more receivers 230 may include a tracking system 270 configured to detect communication signals from client devices. In this regard, processors 210 may keep track of locations of client devices using the tracking system 270. The tracking system 270 may include at least a tracking sensor. The tracking sensor may include, but is not limited to, a position sensitive detector (PSD), a charge-coupled device (CCD) camera, a focal plane array, a photodetector, a quad-cell detector array, or a CMOS sensor. The tracking system 270 is able to track communication signals received from client devices, which may be used by the one or more processors 210 for selecting and directing the plurality of beams for data transmission as described in example methods below. In some instances, the one or more processors 210 may also direct the plurality of beams based on other predetermined rules in addition to or despite the tracked positions of the client devices. For example, one or more of the plurality of beams may be directed to point at a first predetermined location on the ground when HAP station 110 is near or at a country border. For another example, one or more of the plurality of beams may be directed to point at a second predetermined location on the ground when HAP station 110 is at a center of a country not near any country borders.

The one or more processors 210 may also be in communication with one or more sensors (or estimators). The one or more sensors may be configured to monitor a state of the HAP station 110, including tracking the locations of beams outputted by HAP station 110. The one or more sensors may include an inertial measurement unit (IMU), encoders, accelerometers, and/or gyroscopes configured to measure one or more of pose, angle, velocity, torques, as well as other forces. In addition, the one or more sensors may include components configured to measure one or more environmental conditions such as, for example, temperature, wind, radiation, precipitation, humidity, etc. In this regard, the one or more sensors may include thermometers, barometers and/or hygrometers, etc.

Additionally or alternatively, the stations, such as HAP station 110, may be provided with capabilities to perform LTE carrier aggregation. Carrier aggregation capabilities allow HAP station 110 to bond together cells (or channels or carriers) in a same frequency band, or across multiple frequency bands. For instance, HAP station 110 may have a plurality of cells (or channels or carriers), including a primary cell and one or more secondary cells. Each of the plurality of cells may have a different physical cell identification ("PCI"), center frequency, and bandwidth. Each of the plurality of cells may also have a different LTE primary synchronization sequence, LTE secondary synchronization sequence, and downlink reference symbols. In this regard, HAP station 110 may be configured to bond together two or more of the plurality of cells to increase data rate (e.g., megabits per second) and capacity (e.g., megabits per second per kilometer squared). For example, carrier aggregation may be used to bond together a cell in a low frequency band (for example 700 MHz) with a cell in a high frequency band (for example 2.6 GHz). This way, HAP station 110 may use the good propagation characteristic of the cell in the low frequency band to maintain signal quality across a wide coverage area, as well as the additional data capacity of the cell in the high frequency band to transmit and/or receive data. For another example, carrier aggregation may be used to bond together multiple cells in a same frequency band to further increase data capacity.

Each client devices 160 and 170 may be a personal computing devices or a server with a processor, memory, data, and instructions similar to those described above with respect to the one or more processors 210 and 420. Each client devices may further include one or more transmitters and receivers for sending and/or receiving data in communication network 100, such as sending data to and/or receiving data from HAP station 110. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices in accordance with the systems and methods described herein may comprise any device capable of processing instructions and transmitting data to and from humans and other computers including general purpose computers, network computers lacking local storage capability, and set-top boxes for televisions.

Additionally or alternatively, one or more client devices, such as client device 160, may be provided with capabilities to perform LTE carrier aggregation. For instance, client device 160 may be configured to bond together two or more of the plurality of cells of HAP station 110 to increase data rate and data capacity. For example, client device 160 may use LTE carrier aggregation to receive data from HAP station 110 using both a primary cell and a secondary cell. For example, the primary cell may have a first identity and a first center frequency and the secondary cell may have a second identity and second center frequency.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 3:
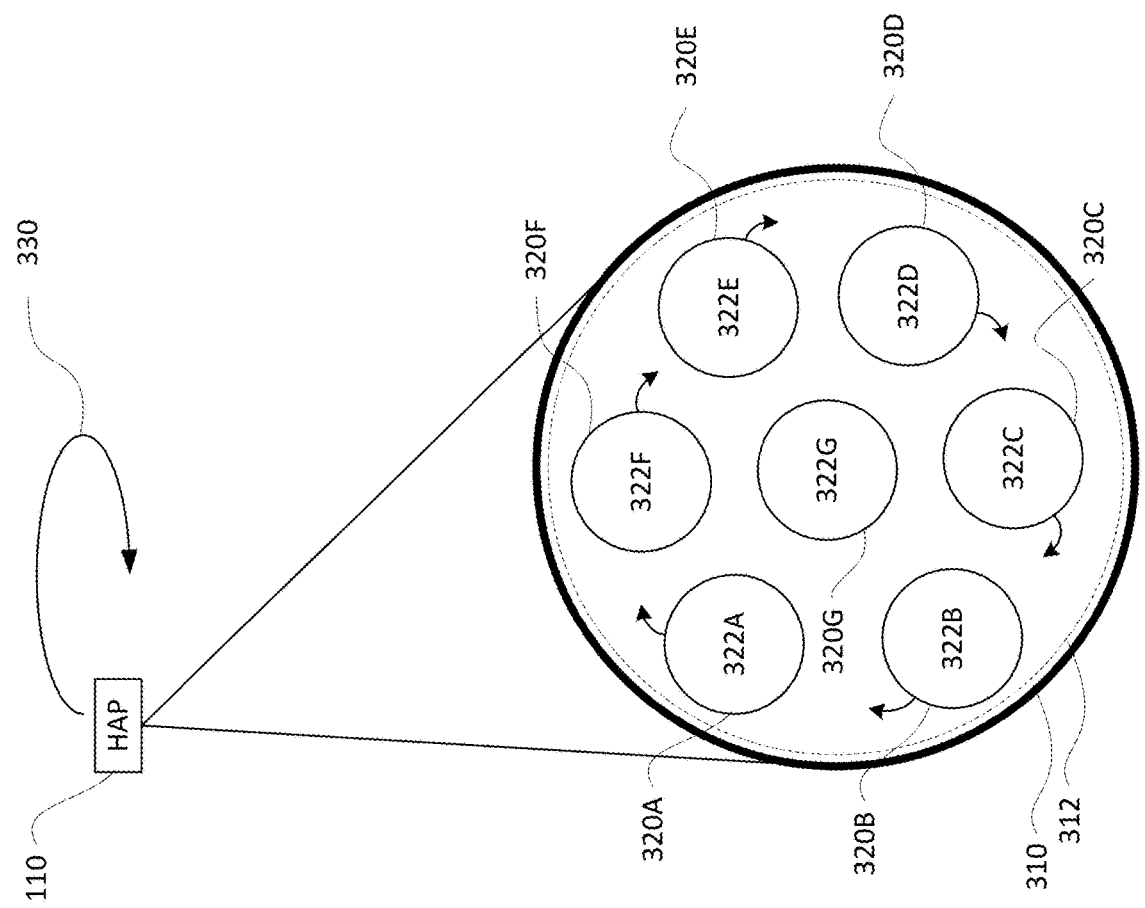
FIG. 3 is a pictorial diagram of an example beam arrangement 300 in accordance with aspects of the disclosure.

FIG. 3 shows an example beam arrangement 300 that may be outputted by the HAP station 110 in accordance with some of the aspects described above. As shown, the beam arrangement 300 includes a plurality of beams 310, 320A-G. For instance, the one or more processors 210 of HAP station 110 may be configured to operate the one or more transmitters 220, receivers 230, and/or the plurality of antennas 240 in order to output the example beam arrangement 300.

As shown, the beam arrangement 300 includes a primary beam 310 (shown as solid circle) covering a geographic area 312 (shown as dotted circle) on the ground. For instance, processors 210 may control the first antenna 242 to point in a first pointing direction, and control the one or more transmitters 220 to transmit the primary beam 310 through the first antenna 242. The first pointing direction may be chosen so that the primary beam 310 reaches the ground at a center of geographic area 312. Further, processors 210 may control the one or more transmitters 220 and the first antenna 242 so that the beam angle of the primary beam 310 is sufficient to provide a coverage area on the ground that is equal to or wider than the geographic area 312. For instance, by lowering the power gain of the first antenna 242, the first antenna 242 may be controlled to output the wide primary beam 310. For example, coverage area of the primary beam 310 may be 20 km in radius or more or less.

As shown, the beam arrangement 300 further includes a plurality of secondary beams 320A-G covering a plurality of locations 322A-G within the geographic area 312. For instance, processors 210 may control the second antenna 244 to point in a second pointing direction, and control the one or more transmitters 220 to transmit a first secondary beam 320A through the second antenna 244. The second pointing direction may be chosen so that the first secondary beam 320A reaches the ground at a first location 322A within the geographic area 312. For another example, processors 210 may control the third antenna 246 to point in a third pointing direction and control the one or more transmitters 220 to transmit a second secondary beam 320B through the third antenna 246. The third pointing direction may be chosen so that the second secondary beam 320B reaches the ground at a second location 322B within the geographic area 312. Similarly, processors 210 may control other antennas of the plurality of antennas 240 to point in various pointing directions, and control the one or more transmitters 220 to transmit the secondary beams 320C-G.

Further, processors 210 may control the one or more transmitters 220 and the plurality of antennas 240 so that the beam angle of each of the plurality of secondary beams 320A-G provides a coverage area on the ground that is much smaller than the geographic area 312. For example, by increasing the power gain of the second, third, and fourth antennas 244, 246, and 248, the second, third, and fourth antennas 244, 246, and 248 may be controlled to respectively output secondary beams 320A-D. For example, coverage area of each of the plurality of secondary beams 320A-G may be 5 km in radius or more or less.

The beam arrangement 300 may be configured such that the plurality of secondary beams 320A-G provide sufficient coverage of the geographic area 312. As shown, since the beam angle of each of the plurality of secondary beams 320A-G is smaller than the beam angle of the primary beam 310, the coverage area for each of the plurality of secondary beams 320A-G is smaller than the geographic area 312. However, the number and arrangement of secondary beams may be chosen so that the plurality of secondary beams may sufficiently cover the geographic area 312. For example, the beam arrangement 300 may include a maximum number of secondary beams that can be fitted within geographic area 312 without having any substantial overlap between any of the secondary beams. In one example (not shown), the plurality of secondary beams may include 7 to 19 beams, where each beam may be 5 km in radius or more or less.

Further as shown in the beam arrangement 300, in order to provide isolation between communication signals transmitted through the plurality of secondary beams 320A-G, the plurality of secondary beams 320A-G do not overlap substantially with one another in space. For instance some small amount of overlap may be present, but may be low enough such that the secondary beams 320A-G can still be considered to be not interfering with each other. In this regard, one or more predetermined thresholds may be set for determining whether the plurality of secondary beams 320A-G interfere with each other and/or with the primary beam 310. For instance, a predetermined threshold for interference may be set based on signals of a first beam measured in a second beam. For another instance, a predetermined threshold for interference may be set based on a comparison between signals of a first beam measured in a second beam and noise level. For example, if signals from secondary beam 320A measured in secondary beam 320B is at least 6 dB lower than noise measured in secondary beam 320B, secondary beam 320A may be determined to be not interfering with secondary beam 320B. For another example, if signals from the primary beam 310 is at least 10 dB stronger than signals from each of the secondary beams 320A-G, primary beam 310 may be determined to be not interfering with each of the secondary beams 320A-G.

When radiofrequency signals are used, this non-overlapping arrangement of the plurality of secondary beams 320A-G provides RF isolation between the plurality of secondary beams 320A-G. As described below, this RF isolation allows more than one of the plurality of secondary beams 320A-G to "reuse" the same frequency or frequency ranges, while maintaining a low RF coupling between the plurality of secondary beams 320A-G. In contrast, since the plurality of secondary beams 320A-G overlap with the primary beam 310, the beam arrangement 300 does not provide RF isolation for the primary beam 310. Therefore, the primary beam 310 cannot "reuse" the same frequency or frequency ranges as the plurality of secondary beams 320A-G.

To efficiently use frequency ranges for the beam arrangement 300 as well as to reduce the need for reselection and handovers as described in more detail below, the primary beam 310 and the plurality of secondary beams 320A-G may be associated with different cells of the HAP station 110. For instance, the primary beam 310 may be associated with a primary cell of the HAP station 110, while the plurality of secondary beams 320A-G may all be associated with a secondary cell of the HAP station 110. For instance, the primary beam 310 may have a first PCI, a first center frequency, a first bandwidth associated with the primary cell. For establishing communication links as described further below, the primary beam 310 may also have a first LTE primary synchronization sequence, a first LTE secondary synchronization sequence, and a first set of downlink reference symbols associated with the primary cell. Likewise, the plurality of secondary beams 320A-G may each have a second PCI, a second center frequency, and a second bandwidth. The secondary beam 320A-G may also each have a second LTE primary synchronization sequence, a second LTE secondary synchronization sequence, and a second set of downlink reference symbols.

In some instances, the first center frequency and the second center frequency may be selected to increase overall efficiency of the HAP station 110. Lower frequencies, which have better propagation qualities (signals able to travel farther) than higher frequencies, are typically more expensive for a network operator to purchase. As such, a lower frequency may be selected as the first center frequency of the primary beam 310 to ensure coverage of the entire area 312, while a higher frequency may be selected as the second center frequency of the secondary beams 320A-G to provide sufficient data capacity at lower costs.

Further, antenna power gain for a wide beam such as primary beam 310 is lower than antenna power gain for a narrower beam such as the plurality of secondary beams 320A-G. As such, signal-to-noise ratio ("SNR") received by a client device on the ground from the primary beam 310 is low. Therefore, transmitting data through primary beam 310 requires more energy, which may be accomplished for example by using a large power amplifier. Therefore, in order to be more power efficient, HAP 110 may be configured such that the bulk of data is transferred using the plurality of secondary beams 320A-G, which have higher antenna power gains.

Still further, with low antenna power gain and low SNR, the primary beam 310 also provides lower data capacity than the plurality of secondary beams 320A-G. The plurality of secondary beams 320A-G further increases the data capacity of the HAP station 110. For example, 7 to 19 secondary beams may be required to provide adequate data capacity for HAP station 110. Further increasing the number of secondary beams may further increase data capacity, however, in order to generate a larger number of secondary beams but still avoiding substantial overlap between the secondary beams, the size of the antennas will also need to be increased, which may be impractical for HAP station 110. As an example, for a secondary cell with a bandwidth of 20 MHz or more or less, 7 to 19 secondary beams may be used to provide a total throughput of 25 Mbps or more or less.

Accordingly, processors 210 may control data traffic transmitted through the primary beam 310 and the plurality of secondary beams 320A-G. For instance, processors 210 may control the data traffic at HAP station 110 so that only a small fraction of data flows through the primary beam 310, and a large fraction of data flows through the plurality of secondary beams 320A-G. In this regard, processors 210 may control the data traffic at HAP station 110 by predetermined types of data. For example, the small fraction of data transmitted and/or received using primary beam 310 may include LTE control messages such as initial resource grants to client devices, random access, and paging, while the large fraction of data transmitted and/or received using the plurality of secondary beams 320A-G may include user data, such as texts, images, audios, videos, etc. For another example, since amount of downlink data is typically much larger than amount of uplink data at a station such as HAP station 110, the small fraction of data may include all uplink data, while the large fraction of data may include all downlink data.

In another aspect, processors 210 may control data traffic so that the primary beam 310 is additionally used for transmission of voice call data, such as VoIP or VoLTE. For example, a VoLTE service may require a data rate of about 64 kilobits per second, while web browsing may require a data rate of 1 megabit per second. However, good voice call service requires a low latency for data transmission. As such, although the primary beam 310 may have much lower capacity than the secondary beams 320A-G, primary beam 310 may still be able to handle a lot of VoLTE channels (or client devices) due to the low bitrate requirement for VoLTE channels. Since signal quality of the primary beam 310 fluctuates less, using primary beam 310 for voice calls may improve voice call qualities such as decrease latency.

Additionally, if the primary beam 310 becomes fully subscribed with voice calls, processors 210 may control the one or more transmitters 220, receivers 230, and/or the plurality of antennas 240 to move one or more VoIP streams from the primary beam 310 to one or more of the plurality of secondary beams 320A-G. In this regard, processors 210 may receive measured signal quality from client devices, and instruct the client devices to perform handover of the VoIP streams from the primary beam 310 to the one or more plurality of secondary beams 320A-G.

To further improve signal quality for client devices, processors 210 may allocate bandwidths to the primary beam 310 and the plurality of secondary beams 320A-G based on volume of data traffic transmitted and/or received through these beams. For instance, since the primary beam 310 carries a small fraction of data and the plurality of secondary beams 320A-G carry a large fraction of data, the primary beam 310 may be allocated a narrower bandwidth than the plurality of secondary beams 320A-G. Further as described above, if the primary beam 310 operates at a lower frequency that is more expensive, allocating more bandwidth to the plurality of secondary beams 320A-G additionally reduces the cost of service. For example, if HAP station 110 has a total of 20 MHz bandwidth available for allocation, processors 210 may allocate 5 MHz of the bandwidth to the primary beam 310, and 15 MHz of the bandwidth to the plurality of secondary beams 320A-G. As such, beam arrangement 300 may provide more efficient use of available bandwidth.

Beam arrangement 300 may also provide more efficient use of power by the HAP station 110. As shown in FIG. 3, the plurality of secondary beams 320A-G are narrower or more focused than the primary beam 310, and thus the plurality of secondary beams 320A-G has a higher gain than the primary beam 310, which is less focused or wider. Since a large fraction of data is transmitted through the plurality of secondary beams 320A-G, which have high gain, most of the data transmission are power efficient. In contrast, more RF power must be used per transmitted bit of data for an LTE downlink using primary beam 310 to ensure that a client device may receive adequate signal. However, since only a small fraction of data flows through primary beam 310, the total power required for an LTE downlink through the primary beam 310 remains low.

For uplink, multiantenna receive algorithms can be employed to increase the sensitivity of the primary beam 310. In this regard, HAP 110 may have more than one receive antennas corresponding to each of the plurality of antennas for generating the beam arrangement 300. For example, the second antenna 244 generating the secondary beam 320A may have two corresponding receive antennas for receiving data from client devices located in area 322A, such as client device 160. As such, both receive antennas may receive a copy of uplink data from client device 160, and the two copies may be combined using Maximal Ratio Combining (MRC) or Interference Ratio Combining (IRC) techniques to restore the uplink data.

Based on the state of a client device, processors 210 may choose one or more beams of the beam arrangement 300 to more efficiently communicate with the client device. For instance, when initially establishing a first communication link with client device 160, processors 210 may use primary beam 310 to broadcast the first LTE primary synchronization sequence, the first LTE secondary synchronization sequence, and the first set of downlink reference symbols associated with the primary cell. Client device 160 may receive the broadcasted information about the primary cell through the primary beam 310 to identify the primary cell. Once the primary cell is identified and the first communication link is formed, client device 160 enters an RRC-idle state, where client device 160 "camps" on the primary cell to wait for either uplink or downlink data. While in the RRC-idle state, client device 160 may monitor signal qualities from multiple frequencies, including signal qualities from the plurality of secondary cells 320A-G, and report the measured signal qualities to HAP 110.

In order to send uplink data or receive downlink data, client device 160 may enter an RRC-connected state. For instance, when the client device 160 has uplink data (for example, client device 160 has a request to send to HAP station 110), client device 160 may initiate a random access procedure with the primary cell through primary beam 310, and transitions or enters into RRC-connected state. Likewise, when downlink data arrives at the HAP station 110 for client device 160 (for example, a text arrives for client device 160), the primary cell may page client device 160 through the primary beam 310, client device 160 then responds with a random access procedure and transitions into RRC-connected state.

If a client device, such as client device 160, has carrier aggregation capabilities, client device 160 may enter RRC-connected state on the primary cell through primary beam 310. Processors 210 of HAP 110 may then instruct client device 160 to bond the primary cell with the secondary cell using carrier aggregation. For example, processors 210 may send to client device 160, through the primary beam 310, the second LTE primary synchronization sequence, the second LTE secondary synchronization sequence, and the second set of downlink reference symbols associated with the secondary cell. Using this information, a second communication link may be formed between the client device 160 and the secondary cell. For instance, processors 210 may use tracking system 270 to determine a location of the client device 160, and the one or more sensors to determine that the location of the client device 160 is covered by the secondary beam 320A. As such, processors 210 may control the second antenna 244 to establish the second communication link through secondary beam 320A. HAP 110 can send data to client device 160 through either the primary cell using the first communication link or the secondary cell using the second communication link. For instance, processors 210 of HAP 110 may continue to use the primary cell to determine signal quality of the first and/or second communication links, since primary beam 310 does not fluctuate with movement of HAP station 110.

If a client device, such as client device 170, does not have carrier aggregation capabilities, client device 170 may initiate a random access procedure, such as sending a Random-Access Channel (RACH) to the primary cell of HAP station 110. Processors 210 of HAP 110 may then instruct client device 170 to enter the RRC-connected state on the secondary cell. For example, processors 210 may send to client device 170, through the primary beam 310, the second LTE primary synchronization sequence, the second LTE secondary synchronization sequence, and the second set of downlink reference symbols associated with the secondary cell. Using this information, a second communication link may be formed between the client device 170 and the secondary cell. For instance, processors 210 may use tracking system 270 to determine a location of the client device 170, and the one or more sensors to determine that the location of the client device 170 is covered by the secondary beam 320A. As such, processors 210 may control the second antenna 244 to establish the second communication link through secondary beam 320A.

As mentioned above, HAP station 110 and client device 160 may each be configured to use carrier aggregation to bond together two (or more) separate LTE cells, such as the primary cell and the secondary cell described above, to increase data rate and data capacity. For instance, using carrier aggregation, client device 160 may simultaneously communicate through beams associated with both the primary cell and the secondary cell of HAP station 110 in the RRC-connected state. As such, processors 210 may control the plurality of antennas 240 to simultaneously maintain both the first communication link through the primary beam 310 and the second communication link through one or more of the plurality of secondary beams 320A-G. In contrast, client device 170 does not have carrier aggregation capabilities and thus cannot maintain both the first communication link and the second communication link. As such, client device may communicate through a beam associated with either primary cell or secondary cell of HAP station 110, but not both at the same time.

As mentioned above, since HAP station 110 may be configured to output the beam arrangement 300 on the ground while moving, processors 210 may control the steering mechanism to maintain coverage of geographic area 312 on the ground despite movements of the HAP station 110. For example as shown, circuit 330 of HAP station 110 has a circular pattern, which HAP station 110 may be configured to complete at a fixed speed. For instance, the HAP station 110 may be configured to complete the circuit 330 every couple of minutes or so. As HAP station 110 moves in the circuit 330, processors 210 may control the one or more transmitters 220, receivers 230, and/or the plurality of antennas 240 to ensure that the primary beam 310 maintains the coverage of geographic area 312. For instance, for the primary beam 310, processors 210 may use the steering mechanism to change the pointing direction of the first antenna 242 as HAP station 110 rotates, such that geographic area 312 remains covered by primary beam 310 despite the movement of HAP station 110. For another instance, for the plurality of secondary beams 320A-G, processors 210 may control the one or more transmitters 220, receivers 230, and/or the rest of the plurality of antennas 240 as HAP station 110 rotates, such that the plurality of secondary beams 320A-G remain inside geographic area 312 without substantially overlapping each other.

Thus, as indicated by the arrows in FIG. 3, coverage area of the plurality of secondary beams 320A-G may tend to rotate with the HAP station 110. For example, secondary beam 320A may rotate with HAP station 110 so that secondary beam 320A will subsequently cover location 322F, then location 322E, then location 322D, . . . , and eventually back to location 322A when HAP station 110 completes circuit 330. In other words, where circuit 330 takes two minutes to complete, location 322A may be in turn covered by secondary beam 320A for 24 seconds, then by secondary beam 320B for 24 seconds, then by secondary beam 320C for 24 seconds, . . . , and eventually by secondary beam 320A again when HAP station 110 completes circuit 330. Further as described above, because the plurality of secondary beams 320A-G do not substantially overlap, at some points during the rotation of HAP station 110, location 322A may not be covered by any of the plurality of secondary beams 320A-G.

Due to the movement of HAP station 110 and the beams as described above, signal quality experienced by a client device located in geographic area 312 may vary. For example, if client device 160 is located at location 322A, signal quality from secondary cell for client device 160 may be strong when location 322A is at a center of secondary beam 320A, but may be weak when location 322A is a near an edge of secondary beam 320A as secondary beam 320A moves towards location 322F. Further, when location 322A is not covered by any of the plurality of secondary beams 320A-G due to the non-overlapping arrangement which avoids substantial overlaps, client device 160 may not receive any signals from secondary cell. In contrast, signal quality from the primary cell for client device 160 remain more or less the same as HAP station 110 rotates, although slight variations may result from slight changes in pointing direction of the first antenna 242. In addition, signal quality for client device 160 may further vary as a result of movement of client device 160.

As described above, changes in signal quality may cause a client device to reselect or handover from one cell (or channel or carrier) to another cell. In LTE communication, reselection occurs in the RRC-idle state. For instance, while a client device is camped on a cell, the client device may monitor signals from neighboring cells. If a neighboring cell meets certain reselection criteria, the client device may reselect that neighboring cell to camp on. However, reselection of a previously undetected call may be slow, for example such as taking 30 seconds or more. Handover may occur in the RRC-connected state. For instance, while a client device is communicating through an uplink or downlink of a cell, if the uplink or downlink deteriorates to a certain extent, the client device may initiate a handover procedure to transfer its connection to a different cell with a better link quality. However, the uplink or downlink may be so deteriorated such that the client device cannot initiate handover, and the client device may declare a radio link failure (RLF). Once RLF is declared, the client device autonomously transfer to another cell.

One way to address the issue of changing signal qualities is by beam steering. However, although beam steering may maintain the same coverage areas of the plurality of secondary beams 320A-G, such methods have many drawbacks. For example, beam steering using a mechanical structure such as a gimbal on HAP station 110 increases the weight and worsens the aerodynamics of the HAP station 110. For another example, beam steering using digital beamforming is not energy efficient, since a large amount of power is required. For still another example, beam steering using analog beamforming has a large implementation loss or loss at the transmitter and receiver.

In contrast, HAP station 110 is configured to address the issue of changing signal qualities using the beam arrangement 300. For instance, beam arrangement 300 may reduce or eliminate the need for reselections in RRC-idle state. For example referring to FIG. 3, primary beam 310 have much smaller variations in signal quality than the plurality of secondary beams 320A-G. Further as described above, consistent signal quality of the primary beam 310 may be further ensured by selecting a lower frequency as the first center frequency. As such, while camped on the primary cell associated with the primary beam 310 in RRC-idle state, client device 160 has no need to reselect another cell while in geographic area 312, since the first communication link between the client device 160 and the primary cell experiences little fluctuation. Further, since a client device camps on the primary beam 310 in RRC-idle state regardless of whether carrier aggregation is available, beam arrangement 300 reduces the need for reselection regardless of whether the client device is capable of carrier aggregation, like client device 160, or not capable of carrier aggregation, like client device 170.

Further in this regard, beam arrangement 300 may reduce or eliminate the need for handovers in RRC-connected state. For example referring to FIG. 3, since all the plurality of secondary beams 320A-G are associated with the same secondary cell, while in the RRC-connected state, no handover between cells is needed for client device 160. For example, while connected to the secondary cell through the second communication link, such as receiving data using a downlink through secondary beam 320A, the signal quality of the downlink may deteriorate as HAP station 110 moves. For instance, client device 160 may measure signal quality of the downlink, and send the measured signal quality to processors 210 of HAP station 110. Processors 210 may determine that the signal quality of the downlink is below a predetermined threshold. Processors 210 may then determine that client device 160 is within an area covered by secondary beam 320B. For instance, processors 210 may determine a location of the client device 160 using tracking system 270 and the location of the plurality of secondary beams 320A-G using the one or more sensors.

Since secondary beam 320B is associated with the same secondary cell of HAP station 110, processors 210 may control the one or more transmitters 220, receivers 230, and third antenna 246 to re-establish the downlink through secondary beam 320B, and continue to send the data using secondary beam 320B to client device 160, without client device 160 having to initiate a handover procedure. In other words, from the perspective of a client device such as client device 160, each of the plurality of secondary beams 320A-G may appear to be the same because all of the plurality of secondary beams have the second PCI, the second center frequency, the second bandwidth, the second LTE primary synchronization sequence, the second LTE secondary synchronization sequence, and the second set of downlink reference symbols. As such, although client device 160 may experience fluctuations in signal quality of the downlink, client device 160 will not initiate a handover since client device 160 does not detect any new PCIs.

Where a client device has carrier aggregation capabilities, beam arrangement 300 may further prevent handovers. For example, since client device 160 may bond the primary cell and the secondary cell using carrier aggregation, client device 160 may have consistent signal quality of the first communication link through primary beam 310 regardless of the movement of HAP station 110, even though signal quality of the second communication link through the plurality of secondary beams 320A-G may vary as HAP station 110 rotates. As such, even if the second communication link through secondary beam 320A deteriorated, client device 160 may not initiate a handover because the first communication link through primary beam 310 remains strong.

Where a client device does not have carrier aggregation capabilities, beam arrangement 300 may reduce impact of handovers. For instance, since client device 170 does not have carrier aggregation capabilities, client device 170 may sometimes need to initiate handovers between the primary cell and the secondary cell. For example, client device 170 may be transmitting or receiving data using the second communication link through secondary beam 320A, but the second communication link may deteriorate as secondary beam 320A moves towards location 322F. As such, client device 170 may initiate a handover procedure from the secondary cell to the primary cell through primary beam 310. For example, the first communication link may be re-established between the client device 170 and the primary cell such that client device 170 may again be in the RRC-idle state. However, because the primary beam 310 as described above maintains consistent signal quality regardless of movement of HAP station 110, even if the second communication link through secondary beam 320A deteriorated, client device 170 will not declare an RLF since a handover may be performed through primary beam 310, which maintains signal quality despite movements of HAP station 110.

Some moment later, while in the RRC-idle state on the primary cell, client device 170 may measure a strong signal quality for the secondary cell, for example as secondary beam 320B moves to cover the location of client device 170, and report to HAP station 110. At that point, client device 170 may again initiate handover from the primary cell to the secondary cell to transition from RRC-idle to RRC-connected state as described above. For instance, processors 210 of HAP 110 may determine that secondary beam 320B covers the location of client device 170, and instructs client device 170 to move to RRC-connected on the secondary cell.

In some instances, some or all of the plurality of secondary beams 320A-G may be configured such that there is more substantial overlap between them. As such, coverage area provided by the plurality of secondary beams 320A-G may be more or less the same as primary beam 310, which entirely covers geographic area 312. The overlapping plurality of secondary beams 320A-G would not be fully isolated in an RF sense. As such, RF coupling in overlapping regions of two or more of the plurality of secondary beams 320A-G may have poor signal quality. For instance, the poor signal quality may be caused by reference symbol distortion. In this regard, processors 210 may be configured to not schedule transmission of data through downlinks to client devices in such overlapping regions. For example, processors 210 may monitor locations of overlapping regions based on pointing directions of the plurality of antennas 240 and the beam angles, and not schedule downlink communication to client devices in such overlapping regions.

In other instances, beam arrangement 300 may be associated with more than two cells of HAP station 110. For instance, HAP station 110 may have three cells, a primary cell, and two secondary cells. Each of the plurality of cells may also have a different PCI, center frequency, bandwidth, LTE primary synchronization sequence, LTE secondary synchronization sequence, and downlink reference symbols. For example, the primary cell may have a first PCI, a first center frequency, and a first bandwidth, a first secondary cell may have a second PCI, a second center frequency, and a second bandwidth, and a second secondary cell may have a third PCI, a third center frequency, and a third bandwidth. In this regard, the primary beam 310 may still be associated with the primary cell, while the plurality of secondary beams 320A-G may be divided into two sets, a first set of secondary beams associated with the first secondary cell, and a second set of secondary beams associated with the second secondary cell. Because the first set of secondary beams and the second set of secondary beams are associated with different center frequencies, the first set of secondary beams and the second set of secondary beams may have overlapping regions. As such, the plurality of secondary beams may be configured to cover more or less the same area as the primary beam. Further, 3-carrier carrier aggregation may be used by HAP station 110 and client devices with carrier aggregation capabilities to bond together the primary cell and the two secondary cells to further increase data rate and capacity. In other instances, beam arrangement 310 may be associated with as many cells of HAP station 110 as the current LTE specifications allow for carrier aggregation. For example, currently LTE allows for up to 5-carrier carrier aggregation.

Figure 4:
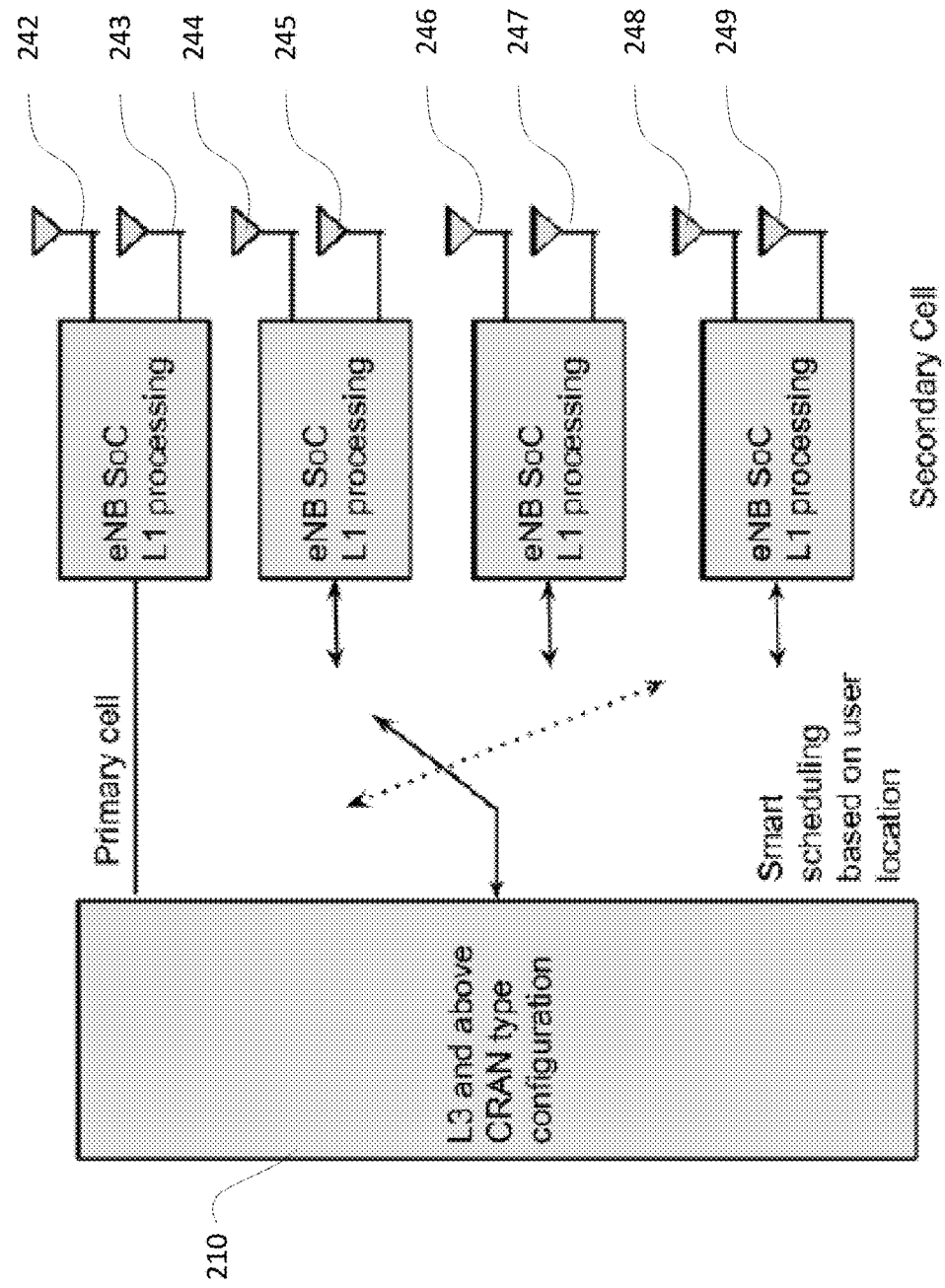
FIG. 4 is a block diagram of a block diagram 400 of the HAP station 110 in accordance with aspects of the disclosure.

Beam arrangement 300 may further allow the processors 210 to perform intelligent scheduling of communications with a client device. FIG. 4 shows a block diagram 400 of the HAP station 110 scheduling communication according to aspects of the disclosure. For instance, processors 210 may be configured to control the one or more transmitters 220, receivers 230, and/or the plurality of antennas 240 to schedule communication with various client devices, such as client devices 160 and 170. As shown, processors 210 may control the one or more transmitters 220 and first antenna 242 to continuously output primary beam 310. For example, as described above the primary beam 310 may be continuously used for transmitting/receiving LTE control messages. Also as shown, processors 210 may control the one or more transmitters 220 and antennas 244, 246, and 248 to transmit data through one or more of the plurality of secondary beams 320A-D. For example, the plurality of secondary beams 320A-D may be scheduled to transmit user data to client devices. Further as shown, processors 210 may control the one or more receivers 230 and receive antennas 243, 245, 247, and 249 for receiving signals and/or data from client devices. Although each of antennas 242, 244, 246, and 248 for generating the plurality of beams is shown with one corresponding receive antenna 243, 245, 247, and 249 respectively, in other examples one or more of the antennas 242, 244, 246, 248 may have more than one corresponding receive antennas.

Processors 210 may be configured to perform intelligent scheduling of communications to account for the movement of the HAP station 110. For instance, if client device 160 is in RRC-connected state and covered by secondary beam 320A, processors 210 may control second antenna 244 to transmit data to client device 160. For another instance, if subsequently, rotation of HAP station 110 causes client device 160 to be covered by secondary beam 320B, processors 210 may control third antenna 246 to transmit data to client device 160 using secondary beam 320B. In this regard, processors 210 may determine a location of the client device 160 using tracking system 270 and the locations of the plurality of secondary beams 320A-G using the one or more sensors.

Beam arrangement 300 may further allow the processors 210 to perform intelligent scheduling of communication with multiple client devices. To illustrate, although primary beam 310 may cover a large geographic area 312, as a single beam, the primary beam 310 is only capable of communicating with one client device at a particular frequency resource (PRB) at a particular instance in time at the first center frequency. This limits the number of simultaneous client devices the primary beam 310 can communicate with. As such, even if the low gain of the primary beam 310 may be increased by using a large power amplifier for the downlink and a large number of receive antennas for the uplink as described above, the primary beam 310 may create a bottleneck when communicating with many client devices within geographic area 312. In contrast, the plurality of secondary beams 320A-G may be used to communicate simultaneously communicate with a plurality of client devices. For example, if client device 160 and client device 170 are both in RRC-connected state, but client device 160 is covered by secondary beam 320A while client device 170 is covered by secondary beam 320B, processors 210 may schedule simultaneous transmission of data to client device 160 through secondary beam 320A and transmission of data to client device 170 through secondary beam 320B.

As the plurality of secondary beams 320A-G rotate with HAP station 110, processors 210 may track locations of the client devices and the locations of the plurality of secondary beams in order to schedule transmissions of data using the set of secondary beams that currently cover the client devices. In this regard, processors 210 may determine locations of the client device 160 and client device 170 using tracking system 270. For example, initially, processors 210 may schedule data transmission to client device 160 at location 322A using secondary beam 320A and simultaneous data transmission to client device 170 at location 322B using secondary beam 320B. Later, as the plurality of secondary beams rotate with HAP station 110, processors 210 may schedule data transmission to client device 160 at location 322A using secondary beam 320B, and simultaneous data transmission to client device 170 at location 322B using secondary beam 320C. Although data transmission is scheduled through different secondary beams, because each of the secondary beams has the same second PCI and second center frequency, the process is seamless for client devices 160 and 170.

For another example, if client device 160 and client device 170 are both in RRC-connected state and both located in an area covered by secondary beam 320A, processors 210 may schedule data transmission to client device 160 and client device 170 sequentially in a cycle. For instance, processors 210 may schedule 1 millisecond of data transmission using secondary beam 320A for client device 160, then 1 millisecond of data transmission using secondary beam 320A for client device 170, and then 1 millisecond of data transmission using secondary beam 320A to client device 160, and so on. Further, processors 210 may track locations of client devices 160 and 170 and the plurality of secondary beams 320A-G, and schedule data transmission to client device 160 and 170 using the respective secondary beam that covers the client devices 160 and 170.

Figure 5:
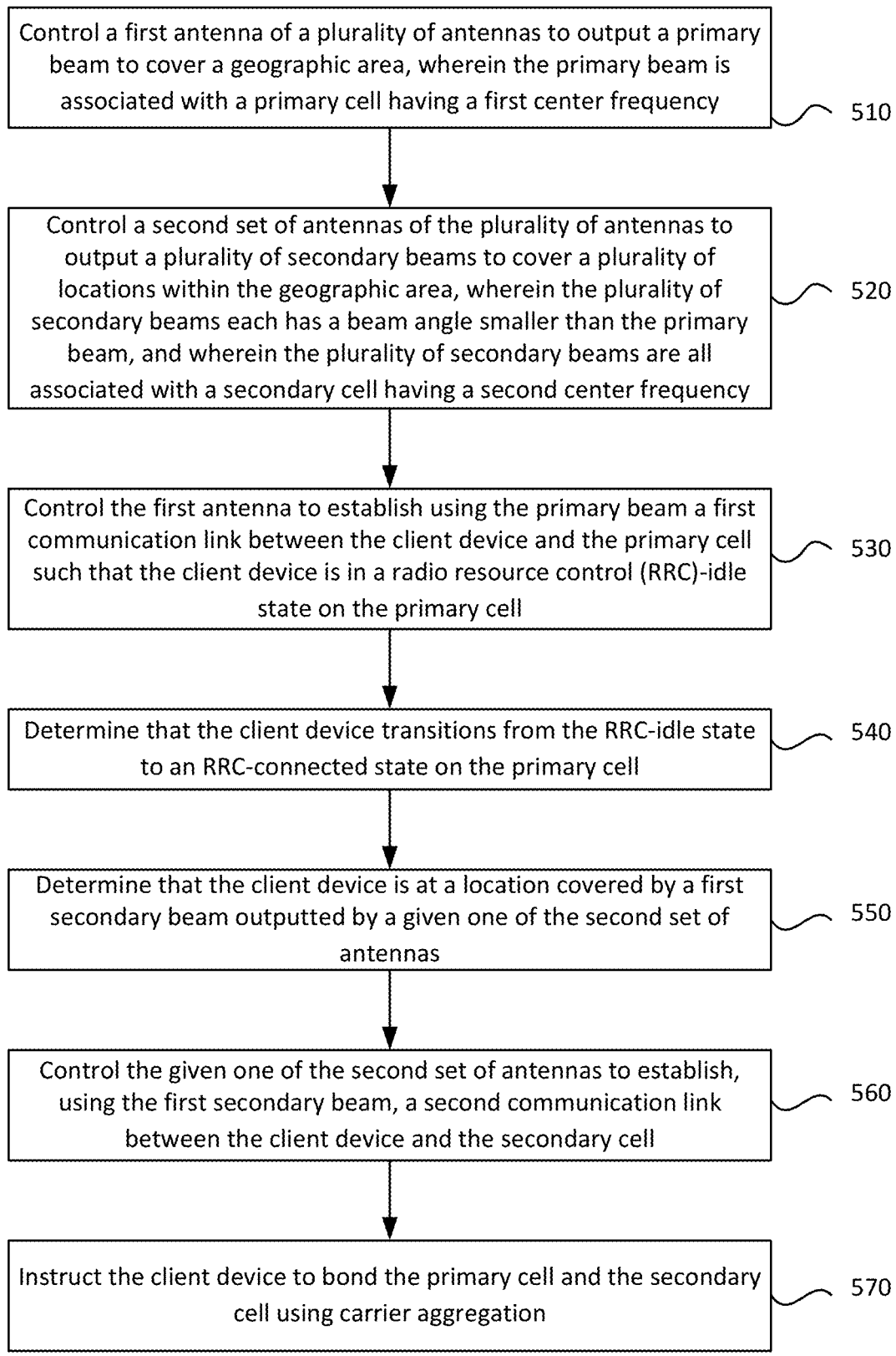
FIG. 5 is a flow diagram 500 of an example method in accordance with aspects of the disclosure.
Figure 6:
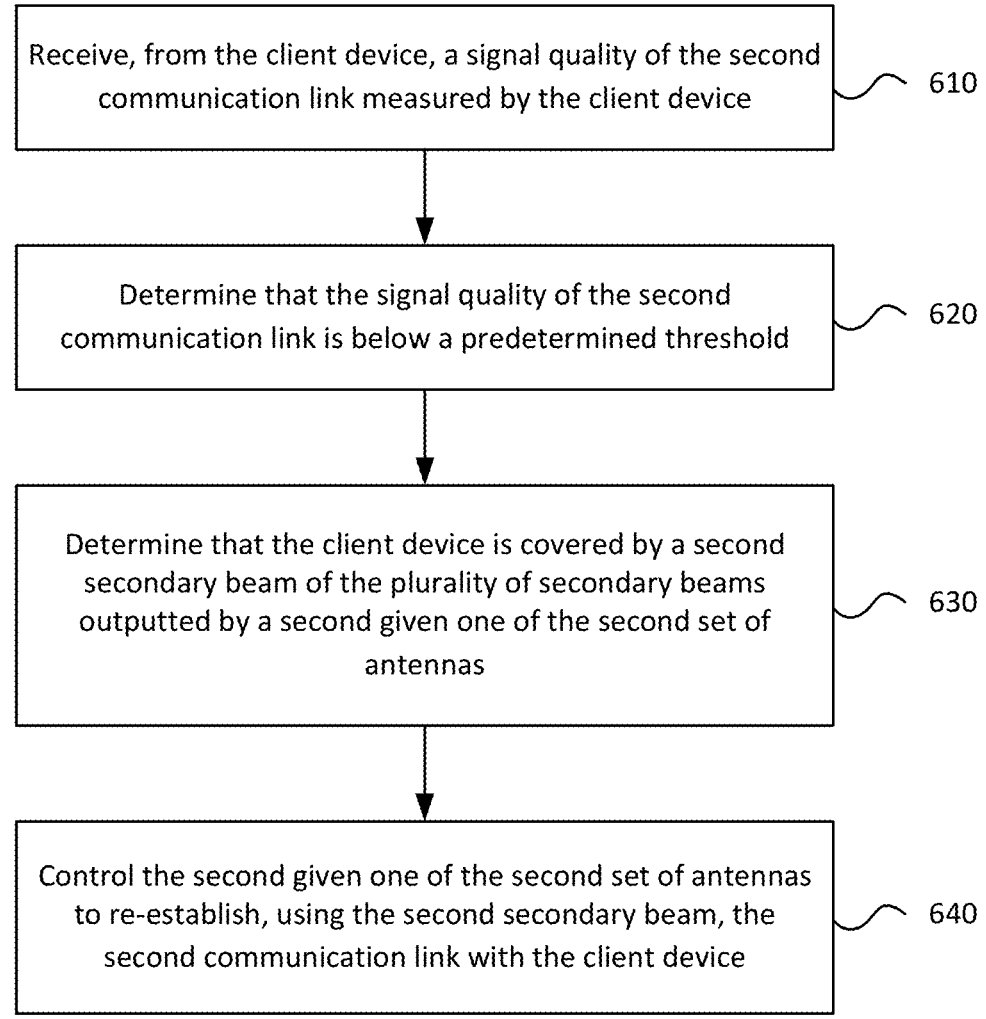
FIG. 6 is a flow diagram 600 of another example method in accordance with aspects of the disclosure.

FIGS. 5 and 6 show flow diagrams 500 and 600 in accordance with some of the aspects described above that may be performed by the one or more processors 210 of the HAP station 110. In this regard, FIG. 5 shows an example of establishing communication links using the primary beam and the plurality of secondary beams. FIG. 6 shows an example of moving a client device between two of the plurality of secondary beams. While FIGS. 5 and 6 show blocks in a particular order, the order may be varied and that multiple operations may be performed simultaneously. Also, operations may be added or omitted.

Referring to FIG. 5, in block 510, a first antenna of a plurality of antennas is controlled to output a primary beam to cover a geographic area, wherein the primary beam is associated with a primary cell having a first center frequency.

In block 520, a second set of antennas of the plurality of antennas are controlled to output a plurality of secondary beams to cover a plurality of locations within the geographic area, wherein the plurality of secondary beams each has a beam angle smaller than the primary beam, and wherein the plurality of secondary beams are all associated with a secondary cell having a second center frequency.

In block 530, the first antenna is controlled to establish using the primary beam a first communication link between the client device and the primary cell such that the client device is in a radio resource control (RRC)-idle state on the primary cell.

In block 540, the client device is determined to transition from the RRC-idle state to an RRC-connected state on the primary cell.

In block 550, the client device is determined to be at a location covered by a first secondary beam outputted by a given one of the second set of antennas.

In block 560, the given one of the second set of antennas is controlled to establish, using the first secondary beam, a second communication link between the client device and the secondary cell.

In block 570, the client device is instructed to bond the primary cell and the secondary cell using carrier aggregation.

Referring to FIG. 6, in block 610, a signal quality of the second communication link measured by the client device is received from the client device.

In block 620, the signal quality of the second communication link is determined to be below a predetermined threshold.

In block 630, the client device is determined to be covered by a second secondary beam of the plurality of secondary beams outputted by a second given one of the second set of antennas.

In block 640, the second given one of the second set of antennas is controlled to re-establish, using the second secondary beam, the second communication link with the client device.

The features described herein may provide more consistent coverage to client devices in a geographic area. The beam arrangement as described allows client devices to be transferred from one beam to another beam, of a mobile station seamlessly, without the client device having to initiate handover procedures. The beam arrangement as described also reduces or eliminates the need for reselection within the geographic area covered by the wide primary beam. In addition, by dividing data traffic and bandwidths between the primary beam and the plurality of secondary beams, the communication system may be more efficient.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A communication system comprising:
a station moving relative to a geographic area;
a plurality of antennas; and
one or more processors configured to:
control a first antenna of the plurality of antennas to output a primary beam to cover the geographic area, wherein the primary beam is associated with a primary cell having a first center frequency;
control a set of second antennas of the plurality of antennas to output a plurality of secondary beams to cover a plurality of locations within the geographic area, wherein each secondary beam of the plurality of secondary beams has a beam angle smaller than a beam angle of the primary beam, and each secondary beam of the plurality of second beams is associated with a secondary cell having a second center frequency; and
control the first antenna to establish using the primary beam a first communication link between a client device and the primary cell such that the client device is in a radio resource control (RRC)-idle state on the primary cell.

2. The communication system of claim 1, wherein the one or more processors are further configured to:
determine that the client device transitions from the RRC-idle state to an RRC-connected state on the primary cell;
determine that the client device is at a location covered by a first secondary beam outputted by a given one of the set of second antennas;
control the given one of the set of second antennas to establish, using the first secondary beam, a second communication link between the client device and the secondary cell; and
instruct the client device to bond the primary cell and the secondary cell using carrier aggregation.

3. The communication system of claim 2, wherein the one or more processors are further configured to:
control the plurality of antennas to simultaneously maintain both the first communication link and the second communication link with the client device.

4. The communication system of claim 2, wherein the one or more processors are further configured to:
receive, from the client device, a signal quality of the second communication link measured by the client device;
determine that the signal quality of the second communication link is below a predetermined threshold;
determine that the client device is covered by a second secondary beam of the plurality of secondary beams outputted by a second given one of the set of second antennas; and
control the second given one of the set of second antennas to re-establish, using the second secondary beam, the second communication link with the client device.

5. The communication system of claim 1, wherein the one or more processors are further configured to:
control the set of second antennas so that interference caused by an overlap between the plurality of secondary beams is within a predetermined threshold.

6. The communication system of claim 1, wherein the first center frequency of the primary cell is lower than the second center frequency of the secondary cell.

7. The communication system of claim 1, wherein the plurality of secondary beams move along with the station such that a coverage area of each of the plurality of secondary beams changes as the station moves.

8. The communication system of claim 1, wherein the one or more processors are further configured to:
control data traffic at the station such that a first fraction of data is transmitted using the primary beam, and a second fraction of data is transmitted using the plurality of secondary beams, wherein the first fraction is smaller than the second fraction.

9. The communication system of claim 1, wherein the one or more processors are further configured to:
allocate a first bandwidth to the primary beam; and
allocate a second bandwidth to the plurality of secondary beams, wherein the second bandwidth is larger than the first bandwidth.

10. The communication system of claim 1, wherein the one or more processors are further configured to:
control the set of second antennas so that the plurality of secondary beams have one or more overlapping regions; and
control the set of second antennas so that data is not transmitted in the overlapping regions.

11. The communication system of claim 1, wherein the one or more processors are further configured to:
determine that a plurality of client devices in the geographic area are located in areas covered by a set of different secondary beams of the plurality of secondary beams;
schedule simultaneous data transmission to the plurality of client devices using the set of different secondary beams; and
control the set of second antennas to simultaneously transmit data to the plurality of client devices based on the schedule.

12. The communication system of claim 11, wherein the one or more processors are further configured to:

determine that, due to movements, the plurality of client devices are covered by a new set of different secondary beams of the plurality of secondary beams; and control the set of second antennas to simultaneously transmit data to the plurality of client devices using the new set of different secondary beams.

13. The communication system of claim 1, wherein the one or more processors are further configured to:

determine that a plurality of client devices in the geographic area are located in areas covered by a given one of the plurality of secondary beams outputted by a given one of the set of second antennas; and control the given one of the set of second antennas so that data is transmitted to the plurality of client devices sequentially in a cycle.

14. The communication system of claim 1, wherein the one or more processors are further configured to:

determine that the client device initiates a random access procedure for transitioning from the RRC-idle state to an RRC-connected state;

determine that the client device is at a location covered by a first secondary beam outputted by a given one of the set of second antennas;

control the given one of the set of second antennas to establish, using the first secondary beam, a second communication link between the client device and the secondary cell; and instruct the client device to enter the RRC-connected state on the secondary cell.

15. The communication system of claim 14, wherein the one or more processors are further configured to:

receive, from the client device, a signal quality of the second communication link measured by the client device;

determine that the signal quality of the second communication link is below a predetermined threshold; and instruct the client device to initiate a handover to the primary cell.

16. The communication system of claim 1, further comprising:

a tracking system for tracking locations of client devices.

17. A communication method of controlling antennas, the method comprising:

controlling, by one or more processors, a first antenna of a plurality of antennas to output a primary beam to cover a geographic area, wherein the primary beam is associated with a primary cell having a first center frequency;

controlling, by the one or more processors, a set of second antennas of the plurality of antennas to output a plurality of secondary beams to cover a plurality of locations within the geographic area, wherein each secondary beam of the plurality of secondary beams has a beam angle smaller than a beam angle of the primary beam, and each secondary beam of the plurality of secondary beams is associated with a secondary cell having a second center frequency; and controlling, by the one or more processors, the first antenna to establish using the primary beam a first communication link between a client device and the primary cell such that the client device is in a radio resource control (RRC)-idle state on the primary cell.

18. A communication system comprising:

a station moving relative to a geographic area;

a plurality of antennas; and one or more processors configured to:

control a first antenna of the plurality of antennas to output a primary beam to cover the geographic area, wherein the primary beam is associated with a primary cell having a first center frequency;

control a set of second antennas of the plurality of antennas to output a plurality of secondary beams to cover a plurality of locations within the geographic area, wherein each secondary beam of the plurality of secondary beams has a beam angle smaller than a beam angle of the primary beam, and each secondary beam of the plurality of second beams is associated with a secondary cell having a second center frequency; and control data traffic at the station such that a first set of predetermined types of data is transmitted using the primary beam, and a second set of predetermined types of data is transmitted using the plurality of secondary beams.

19. The communication system of claim 18, wherein the first set of predetermined types of data includes voice call data.

20. The communication system of claim 1, wherein the primary beam is configured to have a first physical cell identification (PCI) associated with the primary cell, and each secondary beam of the plurality of secondary beams is configured to have a second PCI associated with the second cell.

* * * * *